United States Patent [19]
Cho et al.

[11] Patent Number: 5,625,802
[45] Date of Patent: Apr. 29, 1997

[54] APPARATUS AND METHOD FOR ADAPTING A COMPUTER SYSTEM TO DIFFERENT ARCHITECTURES

[75] Inventors: Hoe T. Cho, Hsing Chung; Maw Z. Jau, Panchiao, both of Taiwan; W. Hugh Durdan, Waban, Mass.

[73] Assignee: Digital Equipment Corporation, Maynard, Mass.

[21] Appl. No.: 353,754

[22] Filed: Dec. 12, 1994

[51] Int. Cl.$^6$ .................................................. G06F 13/40
[52] U.S. Cl. .................. 395/500; 395/307; 364/240; 364/240.2; 364/935.47; 364/DIG. 1; 364/DIG. 2
[58] Field of Search .................................. 395/500, 325, 395/307; 370/84, 85.1, 85.5; 179/175; 364/900 MS File, 200 MS File

[56] References Cited

U.S. PATENT DOCUMENTS

| | | | |
|---|---|---|---|
| 4,328,577 | 5/1982 | Abbott et al. | 370/84 |
| 4,538,033 | 8/1985 | Bruce et al. | 179/175 |
| 4,777,615 | 10/1988 | Potash | 364/900 |
| 5,299,193 | 3/1994 | Szczepanek | 370/85.1 |
| 5,305,317 | 4/1994 | Szczepanek | 370/85.5 |
| 5,305,442 | 4/1994 | Pedersen et al. | 395/325 |

*Primary Examiner*—Kevin J. Teska
*Assistant Examiner*—Russell W. Frejd
*Attorney, Agent, or Firm*—Dirk Brinkman

[57] ABSTRACT

In a computer system, a mother-board is used to physically connect processor, memory, and input/output modules. The mother-board includes an adaptable processor bus for connecting the processor and memory modules, and an input/output bus for connecting the input/output modules, the processor and input/output bus are decoupled for communicating. A processor module including a bridge is used to coupled the processor and input/output buses, and to adapt the processor bus to a particular processor architectures.

4 Claims, 4 Drawing Sheets

APPARATUS AND METHOD FOR ADAPTING A COMPUTER SYSTEM TO DIFFERENT ARCHITECTURES

FIELD OF THE INVENTION

This invention relates generally to computer systems, and more particularly to communications buses used in computer systems.

BACKGROUND OF THE INVENTION

FIG. 1 shows a typical modern computer system 100 which can include one or more processors modules 110, a memory module 120, and input/output (I/O) modules 130. In this, as well subsequent figures, the broken lines generally indicate physically discrete components. Each processor module 110 can include a central processor unit (CPU) 111, a cache 112, and a cache controller (CACHE CTRL) 113 connected to each other by a CPU bus 114 internal to the processor module 110. A memory 121 of the memory module 120 is usually implemented using a plurality of memory cards 122, e.g., "SIMMS," coupled by a memory bus 124. The I/O modules 130 include I/O interfaces 131 for connecting to I/O devices 132, such as disks, tapes, printers, terminals, and so forth, and I/O controllers (I/O CTRL) 133.

A back-plane, or, as it is commonly known in computers of more recent design, a mother-board, 140 provides the physical and electrical coupling for the "daughter" modules 110, 120, and 130. The physical coupling is provided by edge connectors or "slots" 150 mounted on one side surface 149 of the mother-board 140. The slots 150 can receive the modules 110, 120, and 130. The slots can be individually configured to receive modules having different physical and electrical characteristics.

The electrical coupling between the modules 110, 120, and 130 is provided by communication buses 161–163. The communications buses 161–163 include, respectively, signaling paths 141–143 for data, address, and control signals. The signaling paths are usually physically integrated into the mother-board 140, and are connected to pins of the slots 150. Each of the signaling paths 141–143 can include a plurality of electrically conductive lines, not shown. For example, the signalling path 141 used for data signals may include thirty-two lines, and, perhaps, additional parity lines.

In most computer systems, the communications buses 161–163 include a proprietary processor bus 161 for coupling the processor and memory modules. In addition, industry standard I/O buses 162–163 can be used to couple the I/O modules. For example, the I/O buses 162–163 can, respectively, be compatible with the industry PCI and EISA standards.

A bridge 170, physically integrated into the mother-board 140, and directly connected to the processor and I/O bus, provides the interface between signals of the proprietary processor bus 161 and the industry standard PCI bus 162. A second bridge 171 may be used to couple the PCI bus 162 with the EISA bus 163.

It is understood that the configuration of the proprietary processor bus 161 can vary for different processor architectures, or for that matter, for processors of the same architecture, but different manufacturing sources. For example, the number of signaling lines or "width" of the bus can vary. Obviously, a 64-bit system would have about twice as many data and address lines as a 32-bit system.

In addition, the allocation and relative physical position of the lines on the pins of the slots 150 for data, address, and control lines 141–143 can vary. There can also be variations in signaling levels, signaling frequency, and bus protocols. For example, the bus protocols used in a processor of a RISC design may be quite different than the bus protocol used in a processor using a CISC design.

In other words, in traditional computer systems, the design of the mother-board 140, and, more particularly, the design of the proprietary processor bus 161 is dictated by specific processor architectures. Once the architecture has been selected the configuration of the signaling paths 141–143 of the proprietary processor bus 161 is fixed.

For example, consumers buying a computer system having a mother-board configured to receive INTEL "x86" type of processors modules using the 32-bit CISC architecture operating at 30 MHz, would realize that they probably would not be able upgrade their machine, without considerable expense, to receive a more powerful and faster INTEL "PENTIUM" (Tm) type of processor module. Upgrading their computer system to a totally different architecture using, for example, a 64-bit, 200 MHz, "ALPHA" processor from Digital Equipment Corporation, using the RISC architecture, would be beyond consideration. Needless to say, upgrading the system to 128-bit architectures of the future would be practically impossible.

Therefore, it would be an advantage if a computer system could be equipped with a mother-board that is adaptable to different processor architectures. A mother-board which can receive 32-bit CISC processors one day, and 64-bit RISC processors another day, and some day in the future, capable of receiving a 128-bit processors of a yet to be designed architecture would be a preferred consumer choice. Thus, it is desired to adapt computer systems to different processor architectures without substantially increasing the cost or complexity of the system.

SUMMARY OF THE INVENTION

According to the principles of the invention, specific embodiments of which are described in detail below, a computer system is made adaptable to different computer architectures.

In the adaptable computer system, a mother-board can receive processor, memory, and input/output modules. The memory modules may include one or more memory cards to provide storage for data to be processed by the processor modules. The processor module, of which there may be more than one, can include a cache to take advantage of spatial and temporal localities of the data.

The mother-board includes an adaptable processor bus for connecting the processor and memory modules, and an input/output bus for connecting the input/output modules. The input/output buses may be proprietary or compatible with industry standard designs. The processor and input/output buses are decoupled from communicating with each other.

The processor bus includes data, address, and control lines which can be adapted to communicate processor signals according to a plurality of different architectural designs. An exact configuration of the processor bus is not determined until the processor module is connected to the mother-board. That is, the processor module determines the number of signaling paths allocated for the data, address, and control lines, respectively, as well as the signaling levels, frequencies, and protocols used on the processor bus. The processor module can include a bridge for interfacing the signals of the processor bus and the signals of the input/output bus.

DETAILED DESCRIPTION OF A PREFERRED EMBODIMENT

Figure 1:
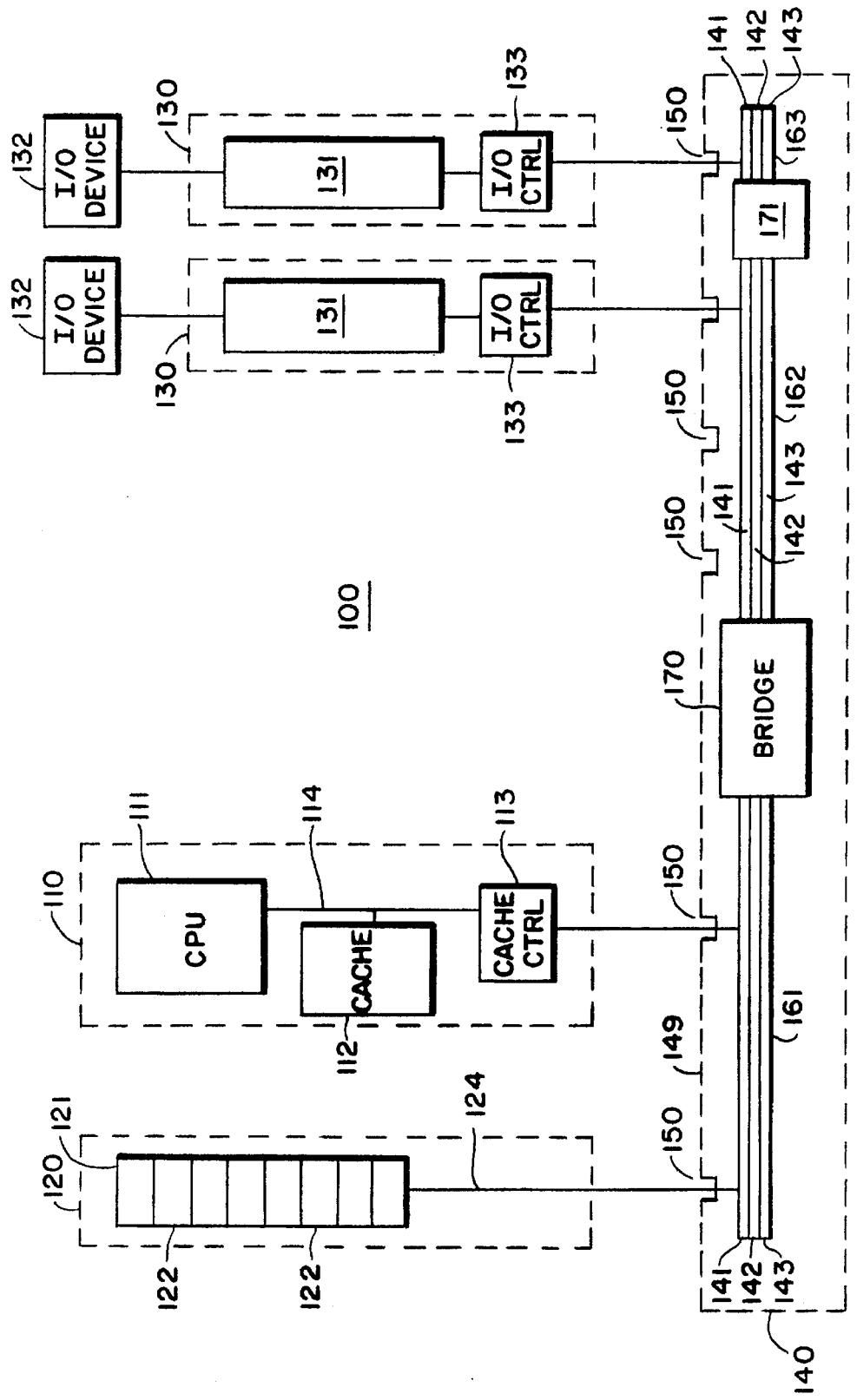
FIG. 1 is a block diagram of a computer system according to the prior art.
Figure 2:
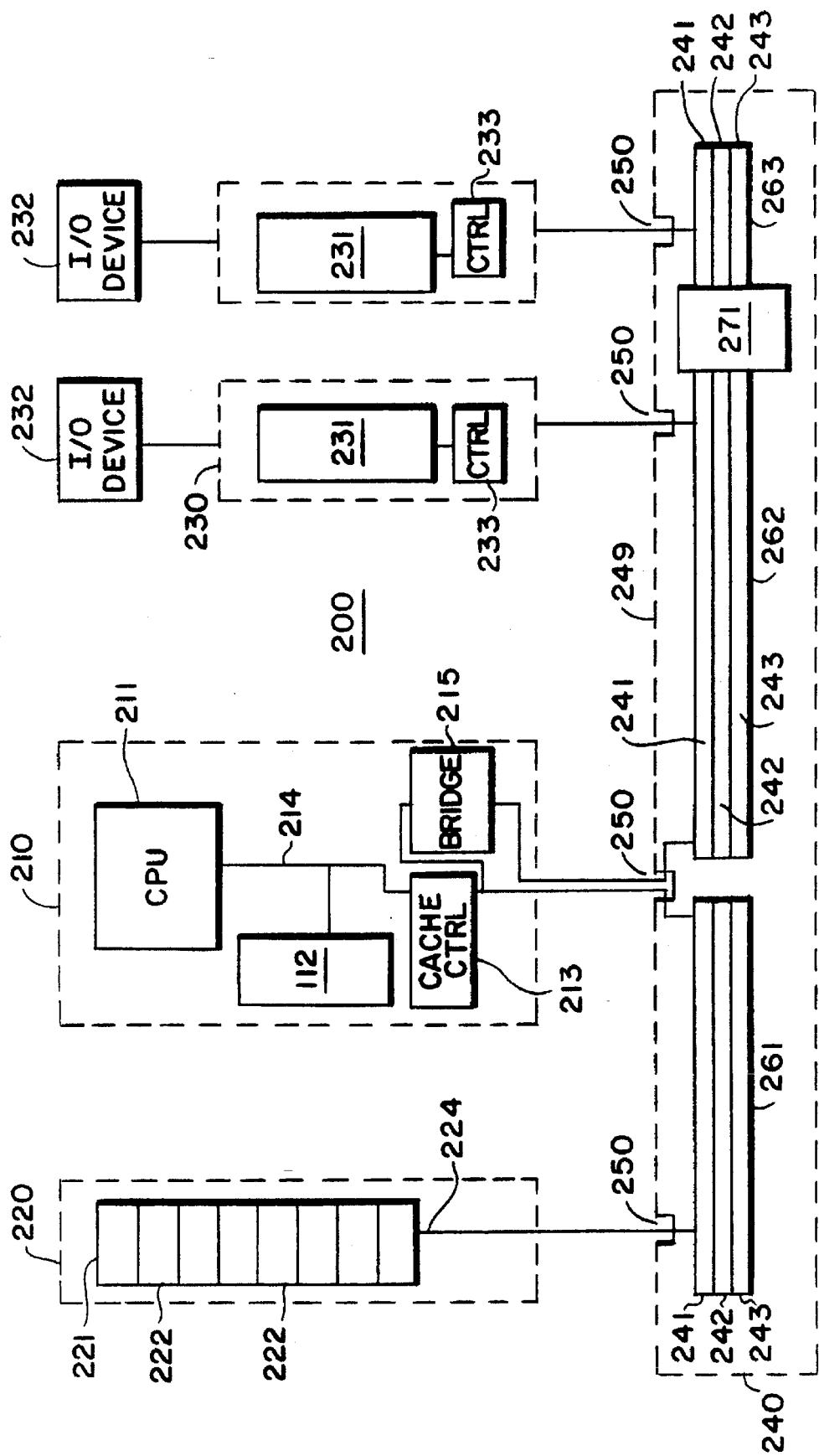
FIG. 2 is a block diagram of a computer system according a preferred embodiment of the invention.

FIG. 2 shows an embodiment of a computer system 200 designed according to the principles of the invention. The system 200 includes one or more processor modules 210, a memory module 220, and input/output (I/O) modules 230. The memory 221 of the memory module 220 is usually implemented using a plurality of memory cards 222, e.g., "SIMMS," coupled by a memory bus 224 to a memory controller (MEM CTRL) 223.

The I/O modules 230 include interfaces 231 for connecting to I/O devices 232, such as disks, tapes, printers, terminal, and so forth, and I/O controllers 233. The processor module 210 includes a central processor unit (CPU) 211, a cache 212, and a cache controller 213 connected to each other by a CPU bus 214 internal to the processor module 210.

A mother-board 240 provides the physical coupling for the "daughter" modules 210, 220, and 230. The physical coupling is provided by edge connectors or "slots" 250 mounted on one side surface 249 of the mother-board 240. The slots 250 can receive the modules 210, 220, and 230, the modules possibly having different physical configurations. The electrical coupling is provided by communication buses 261–163. The communications buses 261–163 include, respectively, signaling paths 241–243 for data, address, and control signals.

In the computer system 200 designed according to the principles of the invention, the buses 261–163 include an adaptable processor bus 261 for coupling processor and memory modules possibly having different architectures. In other words, here the configuration of the processor bus 161 is determined when a processor module 110 of a specific architecture is plugged into the mother-board 240.

In a preferred embodiment of the invention, an instant configuration of the adaptable processor bus 261 is determined, in part, by the architecture of the processor modules as electrically expressed in the cache controller (CACHE CTRL) 213. In other words, in the computer system 200 according to the invention, the exact configuration of the processor bus 261 is determined by the processor module 210, and not by the mother-band, as in prior art systems.

In the system according to the invention, the adaptable processor bus 261 is provided with a substantially greater number of signalling lines than what is found in traditional systems. For example, in a preferred embodiment, the processor bus 261 includes four-hundred signaling lines, and any of the four-hundred signaling lines can be used for data, address, or control signals, as determined by the cache controller 213.

Thus, it is possible for the mother-board 240 to receive processor modules of different architectural designs so that the computer system 200 can readily be upgrade to use higher performance processors, including processors of architectures yet to be designed, without replacing the mother-board 240.

In the system according to a preferred embodiment, the processor bus 261 is coupled to an industry standard I/O bus 262, e.g., a PCI bus, by a bridge 215 mounted, for example, on the processor module 210. That is, in the present invention, the configuration of the processor bus 261 is decoupled from the configuration of the I/O buses 262–263. The cache controller 213 is coupled to the internal CPU bus 214 of the processor module 210, and the bridge 215 interfaces the processor bus 261 and the I/O bus 262 according to the architecture of the CPU 211.

Figure 3:
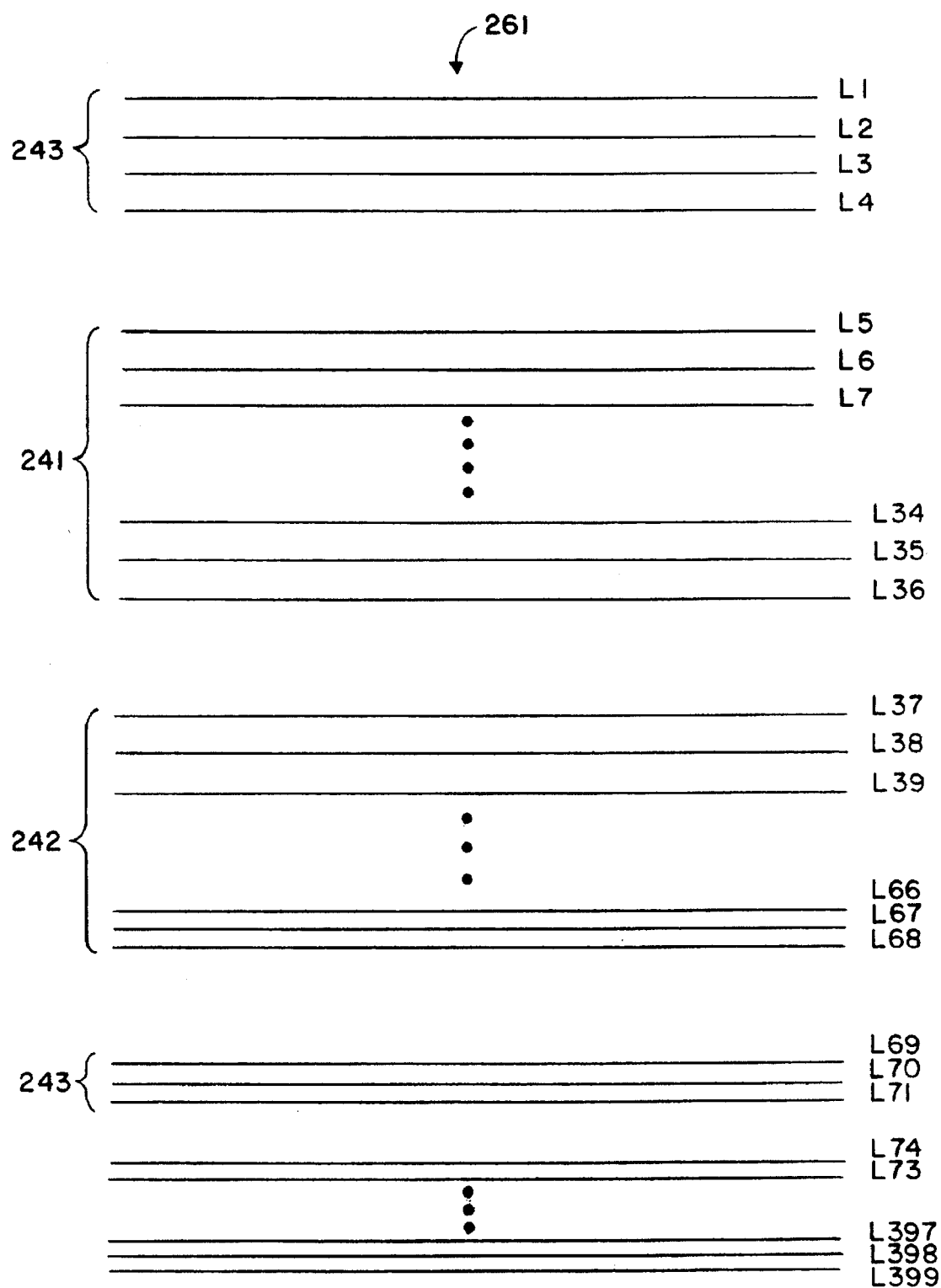
FIG. 3 is a diagram of a processor bus of the system of FIG. 2 having a first configuration.

For example, FIG. 3 shows a first configuration of signaling paths 241–243 as expressed on the adaptable processor bus 261 having, for example, four-hundred lines L1–L399. The configuration shown in FIG. 3 is for a system equipped with, for example, a 32-bit processor module. Lines L1–L4 and L69–L71 can be used for control signals (243). Lines L5–L36 can be used for data signals (242), and lines L37–L68 can be used for address signals (242). Lines L72–L399, in this example, are not used.

Figure 4:
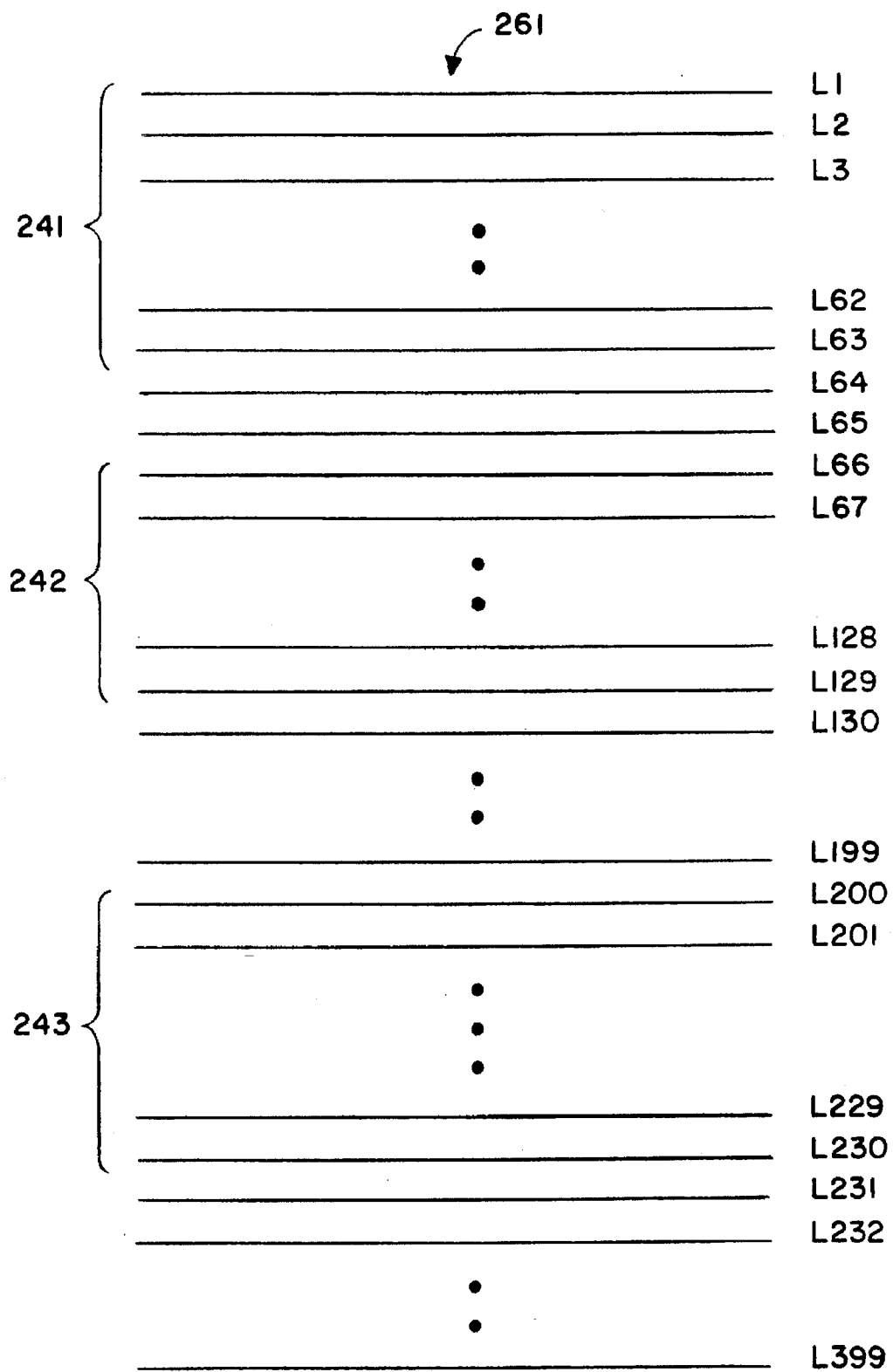
FIG. 4 is a diagram of processor bus of the system of FIG. 2 having a second configuration.

FIG. 4 shows a second configuration of signaling paths 241–243 of the adaptable processor bus 261. The configuration shown in FIG. 4 is for a system equipped with, for example, a 64-bit processor module. Lines L1–L63 can be used for data signals. Lines L66–L129 can be used for address signals, and lines L200-L230 for control signals. Lines L64–L66, L130–L199, and L231–L399 are unallocated. These lines may be used in a system using a 128-bit architecture.

The principles of the invention have been described with respect to specific embodiments. It will be apparent to those skilled in the art that various modifications can be made to the embodiments shown. For example, the computer system can be equipped with a plurality of processor modules and memory modules. The I/O buses may be compliant with other industry standards, or for that matter, the buses may be of a proprietary design, and the buses can be coupled for signaling by other means such as optical coupling. Therefore, the spirit and scope of the invention are set out in the appended claims.

We claim:

1. A computer system mounted on a motherboard, comprising:

a first bus mounted on the motherboard, the first bus for communicating processor address, data, and control signals according to any one of a plurality of different processor architectures;

a second bus mounted on the motherboard, the second bus for communicating input/output address, data, and control signals for a peripheral device, the first bus and the second bus decoupled from communicating with each other;

a memory module mounted on the first bus, the memory module for storing data;

an input/output module mounted on the second bus, the input/output module for connecting to the peripheral device;

a processor module mounted on the first and second bus, the processor module for processing the processor and input/output signals, the processor module including a central processing unit, the central processing unit defining the processor address, data, and control signals of the first bus according to one of the plurality of different processor architectures, the processor module including a bridge to interface the processor address, data, and control signals with the input/output address, data, and control signals.

2. The computer system as in claim 1 wherein the bridge electrically couples the first bus and the second bus.

3. A computer system for different processor architectures mounted on a motherboard, comprising:

a first bus mounted on the motherboard, the first bus for communicating processor address, data, and control signals according to any one of a plurality of different processor architectures;

a second bus mounted on the motherboard, the second bus for communicating input/output address, data, and control signals for a peripheral device, the first bus and the second bus decoupled from communicating with each other;

a memory module mounted on the first bus, the memory module for storing data;

an input/output module mounted on the second bus, the input/output module for connecting to the peripheral device;

a processor module mounted on the first bus and the second bus, the processor module including a central processing unit, the central processing unit defining the processor address, data, and control signals according to one of the plurality of different processor architectures, the processor module to couple the central processing unit to the first bus; and a bridge mounted on the processor module to interface the processor address, data, and control signals and the input/output address, data, and control signals.

4. The computer system as in claim 3 wherein the bridge electrically couples the first bus and the second bus.

* * * * *